United States Patent [19]

Kamisada et al.

[11] Patent Number: 4,841,509
[45] Date of Patent: Jun. 20, 1989

[54] APPARATUS AND METHOD FOR DETECTING FOCUS ERROR SIGNAL AND TRACKING ERROR SIGNAL IN AN OPTICAL DISK SYSTEM

[75] Inventors: Toshimasa Kamisada, Hiratuka; Akira Saito, Odawara, all of Japan

[73] Assignee: Hitachi, Ltd., Tokyo, Japan

[21] Appl. No.: 937,365

[22] Filed: Dec. 3, 1986

[30] Foreign Application Priority Data

Dec. 4, 1985 [JP] Japan ............................. 271450/1985

[51] Int. Cl.⁴ .............................................. G11B 7/13
[52] U.S. Cl. ......................................... 369/46; 369/45
[58] Field of Search ................. 369/44, 45, 46, 109, 369/112; 250/201 DF

[56] References Cited

U.S. PATENT DOCUMENTS

| | | | |
|---|---|---|---|
| 4,059,841 | 11/1977 | Bricot et al. | 369/112 |
| 4,273,998 | 6/1981 | Kanamaru | 369/45 |
| 4,293,944 | 10/1981 | Izumita et al. | 369/112 |
| 4,410,969 | 10/1983 | Maeda | 369/46 |
| 4,507,766 | 3/1985 | Saimi et al. | 369/46 |
| 4,546,460 | 10/1985 | Ando | 369/45 |
| 4,561,081 | 12/1985 | Janssen et al. | 369/46 |
| 4,585,933 | 4/1986 | Ando | 369/112 |
| 4,609,813 | 9/1986 | Cohen | 369/112 |
| 4,631,397 | 12/1986 | Ohsato et al. | 250/201 |
| 4,656,618 | 4/1987 | Kaku et al. | 369/46 |
| 4,670,869 | 6/1987 | Chen | 369/109 |
| 4,682,315 | 7/1987 | Uejima | 369/46 |
| 4,682,316 | 7/1987 | Tateoka et al. | 369/46 |
| 4,691,308 | 9/1987 | Takagi et al. | 369/46 |
| 4,724,533 | 2/1988 | Ohara et al. | 369/46 |
| 4,726,685 | 2/1988 | Kobayashi et al. | 369/46 |
| 4,764,912 | 8/1988 | Ando et al. | 369/46 |

Primary Examiner—Donald McElheny, Jr.
Attorney, Agent, or Firm—Fay, Sharpe, Beall, Fagan, Minnich & McKee

[57] ABSTRACT

An apparatus and method for identifying focus and tracking errors in an optical disk apparatus is provided. Reflections from the disk are generated using a conventional laser light source to produce an optical image including zero and first order diffraction rays. A cylindrical lens converges the image along a single axis to form an elliptical optical image having a major and minor axis and having first and second interference portions aligned along the major axis. A half-mirror type beam splitter splits the image into first and second images which are detected at first and second photodetectors each including first, second, third, and fourth photoreceptive portions. The first and second photoreceptor portions are spaced along the minor axis, the first and fourth photoreceptor portions are spaced along the major axis. The photoreceptors are spaced forward and behind a converging focus point so that the image is converging towards one photodetector and diverging at the second photodetector. Differences that are identified in photoreception between the first and second photoreceptive portions as representative of focus error and differences in photoreception between the third and fourth photoreceptive portions are representative of tracking error.

3 Claims, 4 Drawing Sheets

APPARATUS AND METHOD FOR DETECTING FOCUS ERROR SIGNAL AND TRACKING ERROR SIGNAL IN AN OPTICAL DISK SYSTEM

BACKGROUND OF THE INVENTION

FIELD OF THE INVENTION

This invention relates to an optical disk apparatus wherein an optical disk is irradiated with a beam of light to make tracking control on the basis of the reflected light from the optical disk.

In an optical disk apparatus which radiates laser light to the surface of a rotary recording medium to optically record or reproduce data, an automatic focus servo system is necessary which moves an objective lens of an optical pickup in accordance with vertical motion occurring in the rotating optical disk so that the data recording surface is always within the depth of focus of a laser spot. The automatic focus servo system consists of a voice coil type servo motor, for example, for moving up and down the objective lens, a focus error detecting portion and a servo amplifier for operating the servo motor in accordance with the detected focus error. Among these constituents, the focus error detecting portion is of particular importance. When adapted to the optical disk apparatus, it has desirably such a construction that the change of the reflected rays of light resulting from data pits formed on the data recording surface or from a pregroup forming tracks does not adversely affect a focus error signal. Moreover, it preferably has such a construction that even when any deviation occurs in the optical axis of the reflected rays of light from the data recording surface due to position errors of an optical system, for example, the deviation does not adversely affect the focus error signal.

Various system constructions have so far been proposed for a detector which detects the focus error described above. One of the systems converges the reflected rays of light from the data recording surface (the reflecting surface) by means of a lens and disposes a knife edge at the point of convergence so that only part of the reflected rays of light reaches a photodetector disposed at the rear of the knife edge. (Refer, for example, to "Nikkei Electronics", Nov. 21, 1983, pp. 201–202). This system can obtain a semicircular optical image that rotates in accordance with the focus deviation quantity on the photodetector, when a cylindrical lens is interposed between the convergent lens and the knife edge, and a high accuracy focus error signal can be obtained from a differential output of two split photodetectors. In accordance with this sytem, however, there occurs a problem that a change in the position of the knife edge due to thermal expansion or the like and a deviation of the optical axis of the reflected rays of light affect adversely the focus error signal because the focus error signal depends upon the relation of relative positions between the knife edge and the convergent light.

Another system is disclosed in Japanese Patent Laid-Open No. 77637/1984, for example. This system disposes an optical element on an optical path for converging the reflected rays of light in order to separate the center portion of luminus flux from its peripheral portion in different directions, receives these separated luminus fluxes by separate photodetectors and obtains the focus error signal from the difference between the outputs of the photodetectors. However, this system involves a problem that the error signal contains a noise component because the modes of appearance of changes in the optical quantity are different between the center portion and the peripheral portion of the reflected rays of light due to the data pits and the track described already.

Moreover, the conventional systems described above do not consider the offset of the tracking error signal due to the position error of the optical system.

SUMMARY OF THE INVENTION

It is a main object of the present invention to provide an optical disk apparatus which can reduce the offset of a tracking error signal that occurs due to the movement of a received optical image resulting from the position error of the optical system, and the like.

In accordance with the present invention, the reflected rays of light from the optical disk are guided to a photodetector for detecting a tracking error signal by the use of a unidirectional convergent lens such as a cylindrical lens, and the received optical image in the direction of tracking signal detecting is expanded so that the offset of the tracking signal occurring with respect to the deviation of the received optical image due to the change of the optical axis and the like can be reduced.

DESCRIPTION OF THE PREFERRED EMBODIMENTS

Hereinafter, some preferred embodiments of the present invention will be described in detail with reference to the accompanying drawings.

Figure 1:
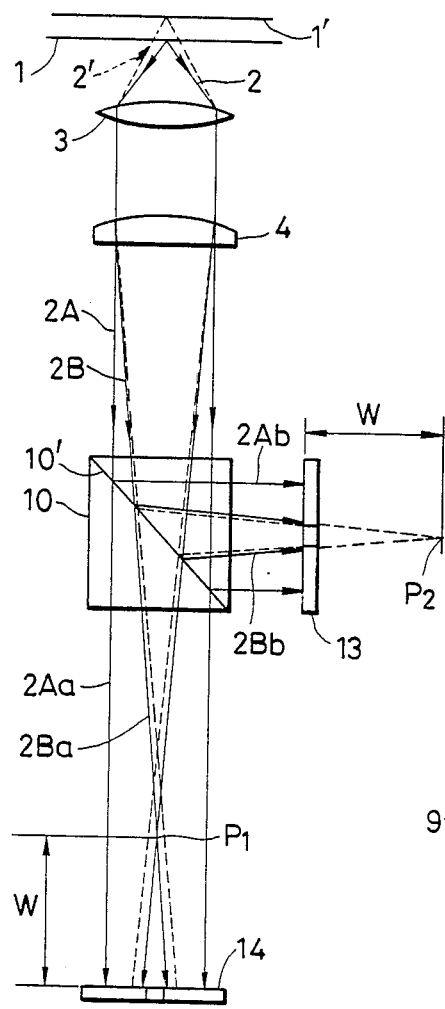
FIGS. 1 and 2 show the theoretical construction of an optical disk apparatus in accordance with the present invention.

FIG. 1 shows the theoretical construction of the present invention. In the drawing, reference numeral 1 represents the reflecting surface of a disk which is in focus; 1' represents the state where the reflecting surface is out of focus in a departing direction from the focus; 2, 2' are reflected light at the respective positions; 3 is a convex lens for converting the reflected rays of light 2, 2' to a parallel pencil or beam of rays when they pass through the lens 3; and 4 is a cylindrical lens which converts the parallel pencil of rays into two, one is a parallel pencil of rays 2A and the other, is a convergent pencil of rays 2B. The convergent pencil of rays 2B is converged at a point $P_1$.

Reference numeral 10 represents a half mirror type beam splitter, for example, which is interposed between the cylindrical lens 4 and the converging point $P_1$ and divides the parallel pencil of rays 2A and the convergent pencil of rays 2B into straight pencils of rays 2Aa, 2Ba and branching pencils of rays 2Ab and 2Bb, respectively. The straight pencil of rays 2Ba and branching pencil of rays 2Bb of the convergent pencil of rays 2B form convergent points $P_1$ and $P_2$ at equidistant positions from the branching plane 10', respectively.

The present invention uses two photodetectors 13, 14. One photodetector (13) is disposed at a position closer to the beam splitter by a predetermined distance w from the convergent point $P_2$ while the other photodetector is disposed at a position away from the convergent point $P_1$ by the predetermined distance w, so that they receive the outgoing rays of light from the beam splitter at the respective positions. The received optical images 11, 12 on the photodetectors 13, 14 are elliptic because the cylindrical lens 4 is disposed.

Figure 3A:
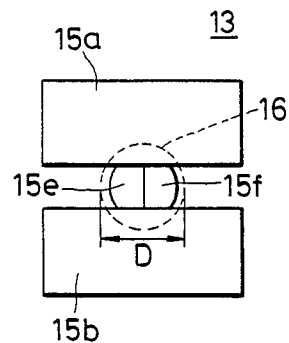
FIGS. 3(A) and 3(B) are plan views, each showing the arrangement and shapes of photoreceptive portions of two photodetectors shown in FIG. 1.
Figure 3B:
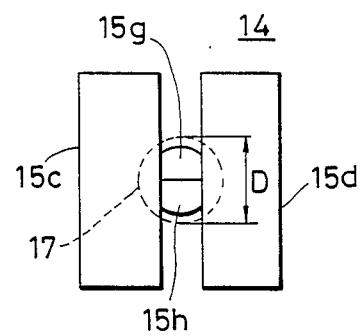

The photodetector 13 has photoreceptive portions 15e, 15f for detecting tracking error signals disposed on the right and left and photoreceptive portions 15a, 15b for detecting focus error signals disposed on and below the photoreceptive portions 15e, 15f, as shown in FIG. 3(A). The photodetector 14 has photoreceptive portions 15g, 15h for detecting tracking error signals disposed in a vertical direction and photoreceptive portions 15c, 15d for detecting focus error signals disposed on the right and left sides of the former, as shown in FIG. 3(B). The sizes of photoreceptive portions 15e, 15f, 15g, 15h are smaller than those of the received optical images 11, 12.

Figure 2:
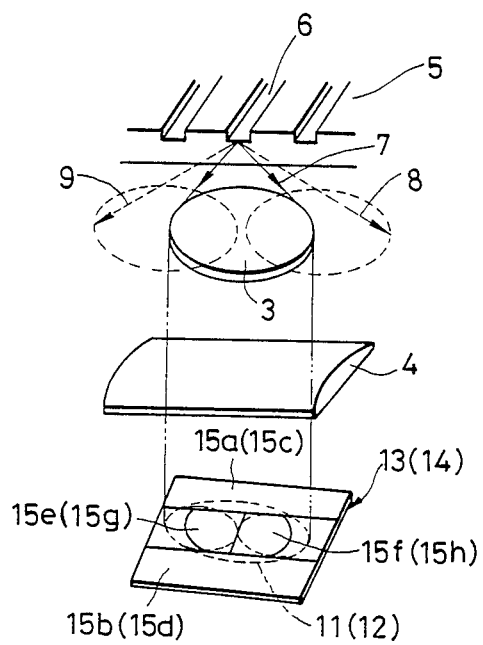

As shown in FIG. 2, the disk 5 has a 0.8 μm-wide guide track 6, for example. The light beam from a laser light source (not shown in the drawing) radiates the guide track 6 and is reflected there as 0-order diffraction rays of light 7, 1-order diffraction ray of light 8 and -1-order diffraction rays of light 9. These rays reach the photodetector 13 (14) through the convex lens 3 and the cylindrical lens 4.

The cylindrical lens 4 is set in a direction such that the 1-order diffraction rays 8 and -1-order diffraction ray 9 appear on the elliptic optical images 11, 12 received in the direction of their major axes, respectively.

The photodetectors 13, 14 are disposed in directions such that their photoreceptive portions 15e, 15f and 15g, 15h are aligned in the direction in which the reflected rays of light are not converged, or in other words, in the direction of the major axes described above, while the photoreceptive portions 15a, 15b and 15c, 15d are aligned in the direction in which the reflected rays of light are converged, or in the direction of the minor axes of the elliptic optical image received, respectively.

Figure 4A:
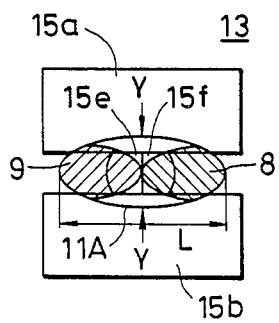
FIGS. 4(A) and 4(B) show the received optical image on each photodetector when in focus.
Figure 4B:
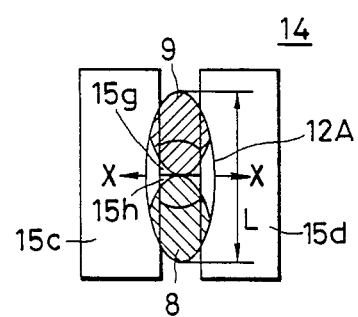

At the time of in-focus, the received optical image 11 on the photodetector 13 is in the state such as shown in FIG. 4(A) while that 12 of the photodetector 14 is in a state such as shown in FIG. 4(B). In these drawings, portions represented by oblique lines are the interference portions of diffracted rays of light. The received optical images 11, 12 are at positions where the outputs of the photoreceptive portions 15a, 15b and 15c, 15d are substantially equal to one another. The focus error signal is obtained as $(A+B)-(C+D)$ where A, B, C and D represent the outputs of the photoreceptive portions 15a, 15b, 15c and 15d, respectively. The tracking error signal TR is obtained as $(E-F)+(G-H)$ where symbols E through H represent the outputs of the photoreceptive portions 15e through 15h, respectively.

When the reflecting plane 1 shifts to the position 1', the convergence point of the two convergent pencils of rays moves frontward of the point $P_1$, $P_2$ at the time of infocus, as represented by dash lines in FIG. 1. Accordingly, the received optical image on the analyzer 13 becomes small in the Y direction. In other words, it is contracted in the direction of the minor axis. On the other hand, the received optical image on the analyzer 14 becomes great in the X direction, or in the direction of the minor axis. At this time, the output (C+D) of the photodetector 14 is greater than the output (A+B) of the photodetector 13, and the difference of the output signals of these two photodetectors 13, 14 corresponds to the focus error quantity.

Figure 5A:
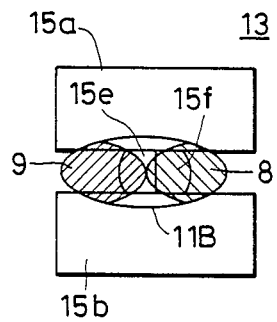
FIGS. 5(A) and 5(B) show the state of movement of the received optical image when any optical component causes a position error.
Figure 5B:
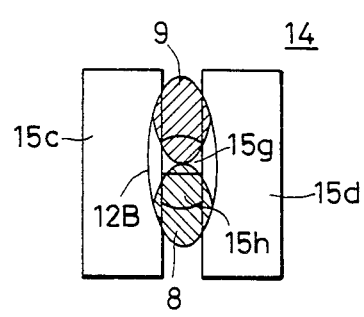

When the position error of any optical component such as the convex lens 3 or the like in FIGS. 1 and 2 occurs due to a temperature change or the like in a direction that causes the tracking error, the received optical images on the photodetectors 13, 14 move to the points 11B, 12B shown in FIGS. 5(A), 5(B), for example. Due to the movement of these images, the tracking error signal becomes $[(E+p)-(F-q)]+[(G+p)-(H-q)] = (E-F)+(G-H)+2p+2q$. Accordingly, the offset of $2p+2q$ where p represents the increased output on photoreceptive portions 15e and 15g due to the tracking error and q represents the decreased output on portions 15f and 15h occurs to decrease the tracking accuracy.

Figure 6:
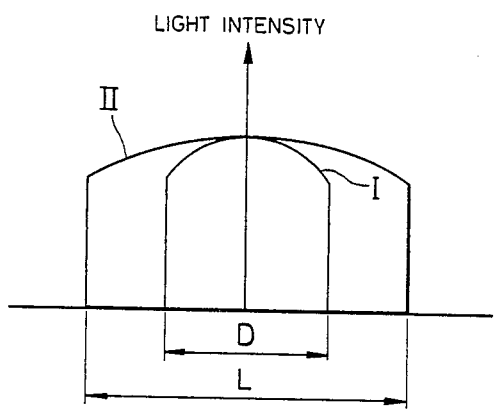
FIG. 6 shows the intensity distribution of an elliptic optical image received in comparison with that of a circular optical image received.

When an ordinary convex lens is used in place of the cylindrical lens 4 described above, circular optical images received 16, 17, each having a diameter D represented by dash lines in FIGS. 3(A) and 3(B), appear on the photodetectors 13, 14, respectively. Since this embodiment uses the cylindrical lens 4, however, the received optical image 11 (12) becomes elliptic and its length L in the direction of the major axis is greater than the diameter D. In FIG. 6, a curve I represents the intensity distribution of the received optical image 16 (17) and a curve II represents that of the received optical image 11B (12B). It can be understood from this diagram that the intensity distribution of the optical image 11B (12B) is expanded by L/D times (=K) when compared with that of the optical image 16 (17).

Therefore, the degree of influence of the movement of the received optical image 11 (12) in the direction of the major axis upon the tracking error signal becomes 1/K of that of the cylindrical image and the tracking offset becomes 1/K so that the tracking accuracy can be improved.

Figure 7A:
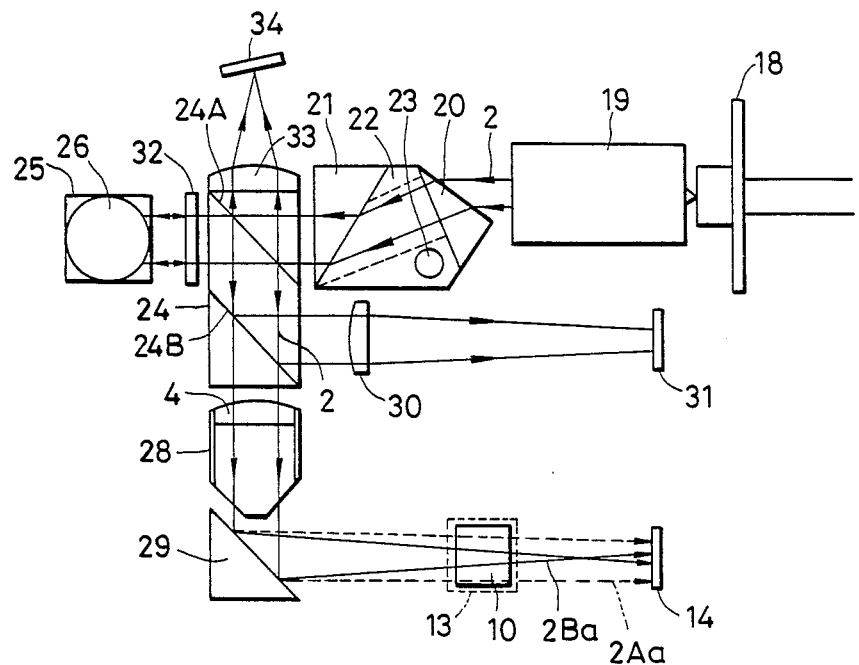
FIGS. 7(A) and 7(B) show one embodiment of the present invention.
Figure 7B:
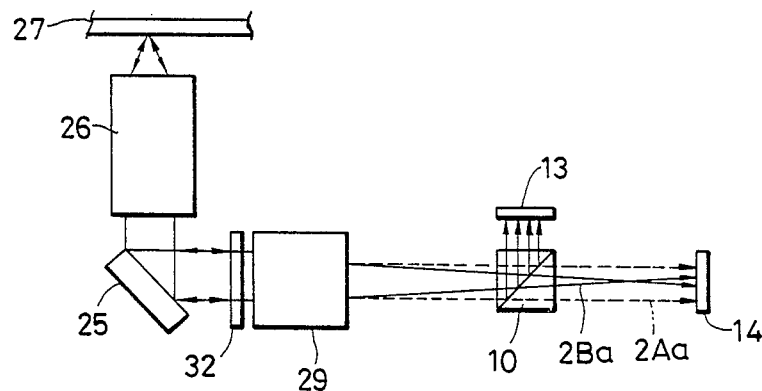

FIGS. 7(A) and 7(B) show one embodiment of the present invention. In the drawing, like reference numerals are used to represent like constituents as in FIG. 1 and the description of such constituents is omitted. The rays of light 2 emitted from a laser diode 18 is turned into a parallel pencil of rays by a collimator 19. Prisms 20, 21 are disposed in order to expand the width of the rays of light 2 in one direction and are fixed to a body 22 by a holder 22 and a screw through a hole 23. The holder 22 is made of ceramic, for example, so that its thermal expansion coefficient is in agreement with that of the prisms 20, 21. The rays of light 2 passing through a beam splitter 24, a ¼ wavelength plate 32, a TR mirror 25 and an objective lens 26 forms a focus on an optical disk 27. At this time part of the ray 2 is reflected by a surface 24A and reaches an analyzer 34 through a lens 33 and the quantity of the ray 2 is detected. The photodetector 34 is disposed slantingly lest the reflected rays of light from the photodetector 34 should affect adversely other photodetectors. The reflected rays of light from the optical disk 27 are reflected by the surface 24A of the beam splitter and separated into two directions by the surface 24B. One pencil of rays reaches the photodetector 31 through a lens 30 and reproduces the signal on the optical disk 27. The other is introduced into the apparatus described with reference to FIG. 1. The cylindrical lens 4 is fitted to the holder 28 and the mirror 29 is disposed so as to bend the rays of light 2 and to reduce the overall dimensions.

Figure 8:
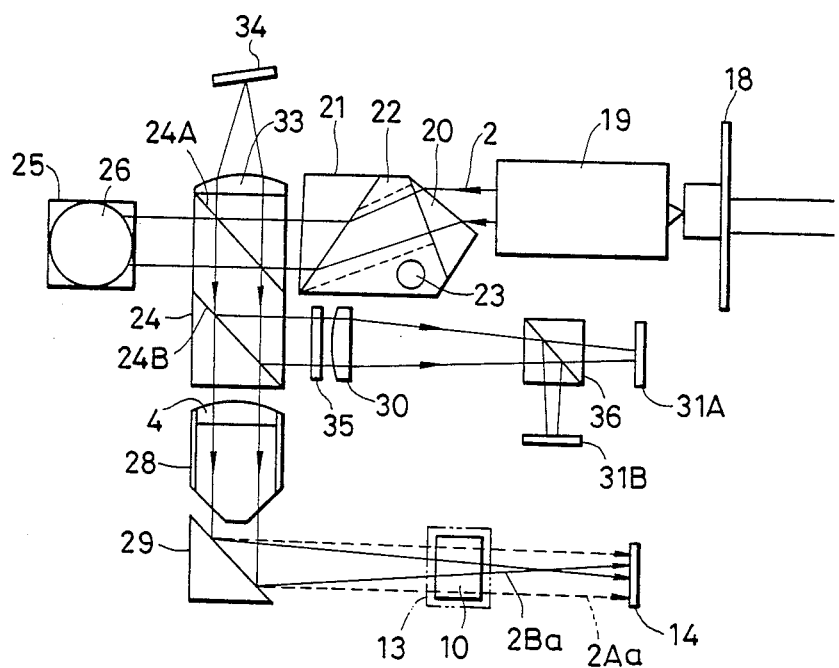
FIG. 8 shows another embodiment of the present invention.

FIG. 8 shows another embodiment of the present invention. In the drawing, like reference numerals are used to identify like constituents as in the foregoing embodiment. The difference of this embodiment from the foregoing embodiment lies in that the change of the polarized light component of the rays of light 2 is read out as a signal, the ¼ wavelength plate is omitted and the surfaces 24A and 24B respectively have limited reflection factors and transmission factors. The signal is detected by separating the rays of light passing through a ½ wavelength plate 35 into two directions by means of a polarizing beam splitter 36 and receiving them by photodetectors 31A and 31B, respectively, to detect the difference of outputs of the photodetectors 31A and 31B. Since the beam splitter 10 separates the rays of light 2 into two directions in substantially equal light quantities without depending upon the polarized light component, an excellent focus error signal without the influence of the signal component can be obtained.

In accordance with the present invention, the rays of light from the reflecting surface on which focusing is made is collected only in one direction so that the received optical image on the surface for detecting the tracking error signal is large and the tracking offset quantity resulting from the deviation of the received optical image is small.

What is claimed is:

1. A system for detecting a signal representative of a focus error and tracking error by an optical disk reader comprising:

means for irradiating the disk to obtain reflected zero and first order diffraction rays;

a cylindrical lens for selectively converging the rays to an elliptical image having a major axis defined by nonconverged rays and a minor axis defined by converged rays, the image including first and second interference portions of the diffraction rays defined by the interference of the first order diffraction rays with the zero order diffraction rays;

a beam splitter disposed to split the rays into first and second photoreceptive images;

first and second photodetectors selectively spaced forward and behind a convergent point for reception of a converging image at the first photodetector and an expanding image at the second photodetector, and each having at least four photoreceptive portion, a selective two of the four being aligned with the major axis for detecting tracking errors and a selective other two being aligned with the minor axis for detecting focus error from reception of the photoreceptive images each photoreceptive portion being capable of producing an output representative of received image intensity; and, said selected major axis photoreceptive portions being disposed to identify a tracking error represented by a sum of the differences between outputs from the major axis photoreceptive portions of each photodetector and said minor axis photoreceptive portions being disposed to identify a focus error represented by a difference of the sums between outputs from the minor axis photoreceptive portions of each photodetector.

2. A method for identifying focus and tracking errors in an optical disk apparatus comprising the steps of:

forming an optical image from reflections from the disk including zero and first order diffraction rays;

converging the image along a single axis to form an elliptical image having a major and minor axis, and having first and second interference portions aligned along the major axis;

splitting the image to form first and second photoreceptive images;

detecting the first and second photoreceptive images at first and second photodetectors including first, second, third, and fourth photoreceptive portions, the photodetectors being spaced forward and behind a converging focus point, the first and second photoreceptive portions being spaced along the minor axis, the third and fourth photoreceptive portions being spaced along the major axis;

identifying differences in photoreception between the first and second photodetectors at the first and second photoreceptive portions as representative of focus error and identifying differences in photoreception between the third and fourth photoreceptive portions as representative of tracking error.

3. The method as defined in claim 2 wherein the first photoreceptive image is converging towards the first photodetector and the second photoreceptive image is expanding toward the second photodetector.

* * * * *